United States Patent
Yoshida et al.

(10) Patent No.: US 7,248,383 B2
(45) Date of Patent: Jul. 24, 2007

(54) PRINT DISTRIBUTION SYSTEM AND PRINT DISTRIBUTION PROGRAM

(75) Inventors: Toshikuni Yoshida, Kawasaki (JP); Masatoshi Sato, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 164 days.

(21) Appl. No.: 10/639,426

(22) Filed: Aug. 13, 2003

(65) Prior Publication Data
US 2004/0061894 A1    Apr. 1, 2004

Related U.S. Application Data

(63) Continuation of application No. PCT/JP01/01213, filed on Feb. 20, 2001.

(51) Int. Cl.
*G06F 15/00* (2006.01)
*G06K 15/00* (2006.01)

(52) U.S. Cl. ...................... 358/1.15; 358/300

(58) Field of Classification Search ............... 358/1.1, 358/1.9, 1.13, 1.15, 448, 402, 300
See application file for complete search history.

(56) References Cited

U.S. PATENT DOCUMENTS

| | | | |
|---|---|---|---|
| 5,699,495 A * | 12/1997 | Snipp | 358/1.15 |
| 6,160,631 A | 12/2000 | Okimoto et al. | 358/1.15 |
| 6,498,656 B1 * | 12/2002 | Mastie et al. | 358/1.15 |
| 6,529,286 B1 * | 3/2003 | King | 358/1.14 |
| 6,687,018 B1 * | 2/2004 | Leong et al. | 358/1.15 |
| 7,061,635 B1 * | 6/2006 | Wanda et al. | 358/1.15 |

FOREIGN PATENT DOCUMENTS

| | | |
|---|---|---|
| EP | 0 851 384 A2 | 7/1998 |
| EP | 0 881 816 A2 | 12/1998 |
| JP | A 7-129337 | 5/1995 |
| JP | A 8-130554 | 5/1996 |
| JP | A 10-327288 | 12/1998 |
| JP | A 11-17732 | 1/1999 |
| JP | A 11-143802 | 5/1999 |
| JP | A 11-220490 | 8/1999 |
| JP | A 11-289415 | 10/1999 |
| JP | A 2000-69077 | 3/2000 |
| JP | A 2000-155722 | 6/2000 |

* cited by examiner

*Primary Examiner*—Gabriel I. Garcia
(74) *Attorney, Agent, or Firm*—Oliff & Berridge, PLC

(57) ABSTRACT

The present invention provides a print distribution system in which plural printing apparatuses are connected over a network, and printed data created by a data processing apparatus of a sender is distributed to plural distribution destinations. The print distribution system includes an association information holding unit that holds in advance information indicating correspondences between plural distribution destinations and plural printing apparatuses used in the plural distribution destinations, and a print setting management unit that collectively manages settings of print conditions of the plural printing apparatuses. When a request to print out the printed data is outputted from the sender, the print setting management unit, on the basis of information held in the association information holding unit, locates plural printing apparatuses used in specified plural distribution destinations, sets the print conditions for the plural located printing apparatuses, and activates the printout of the printed data.

9 Claims, 13 Drawing Sheets

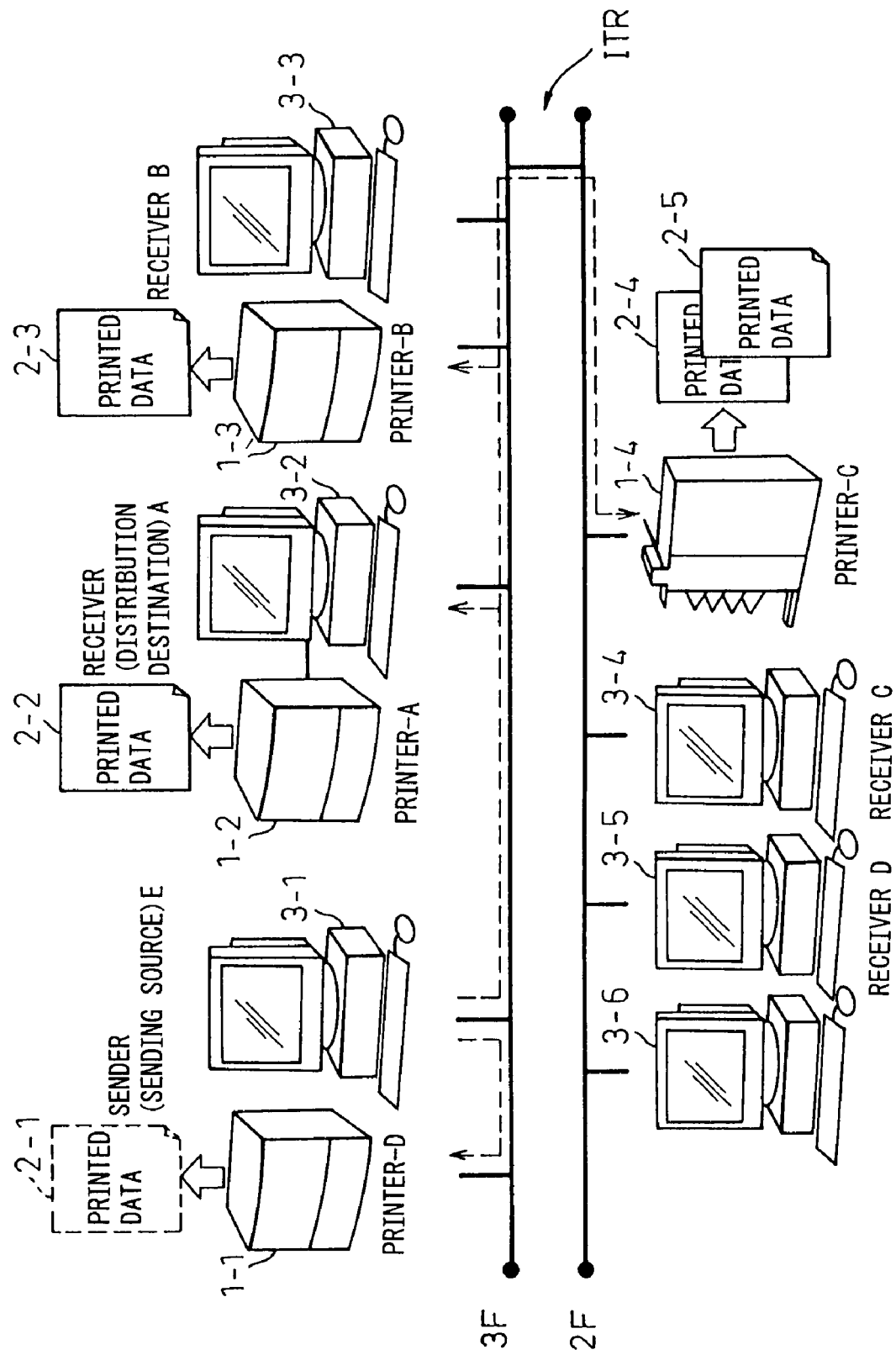

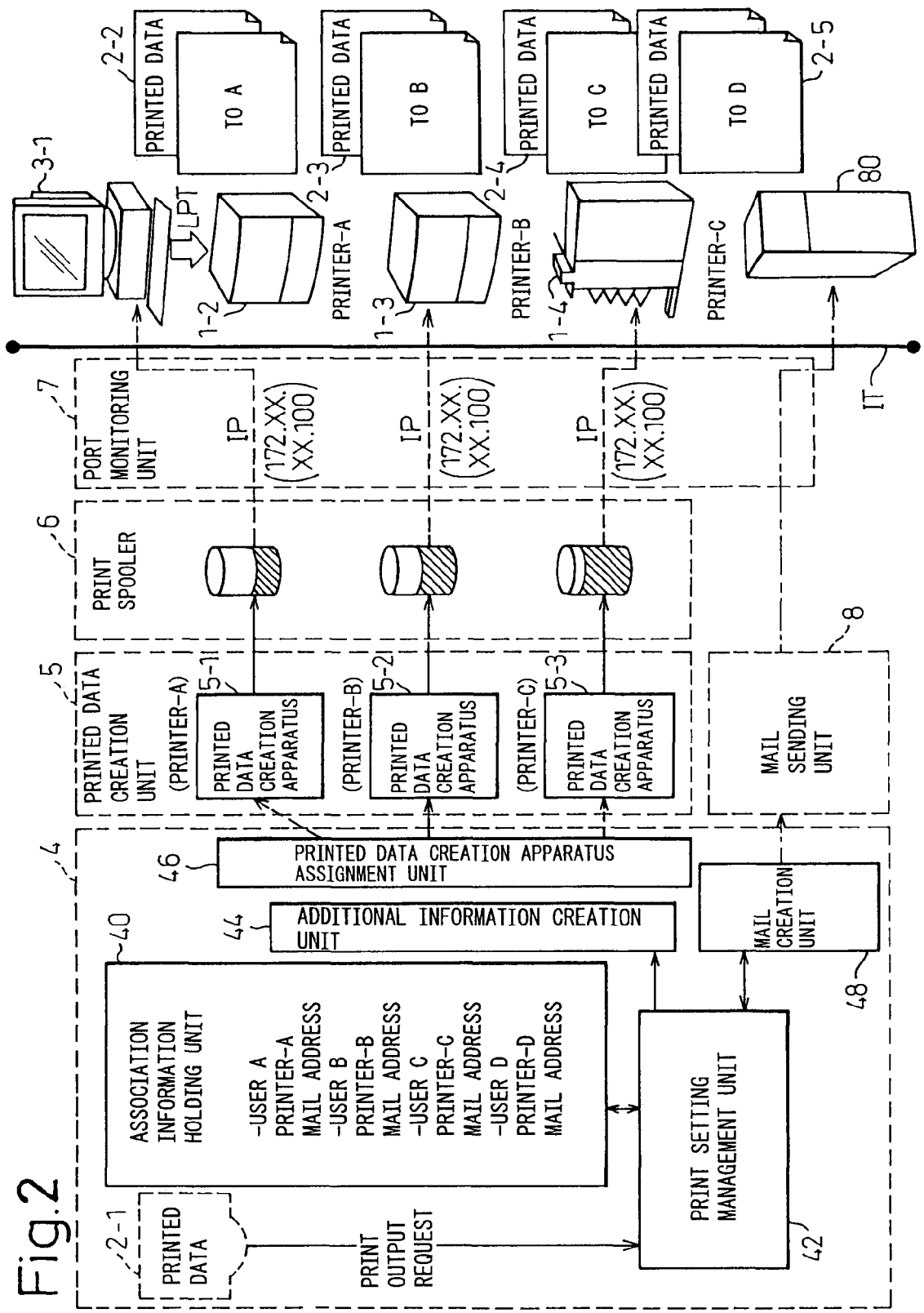

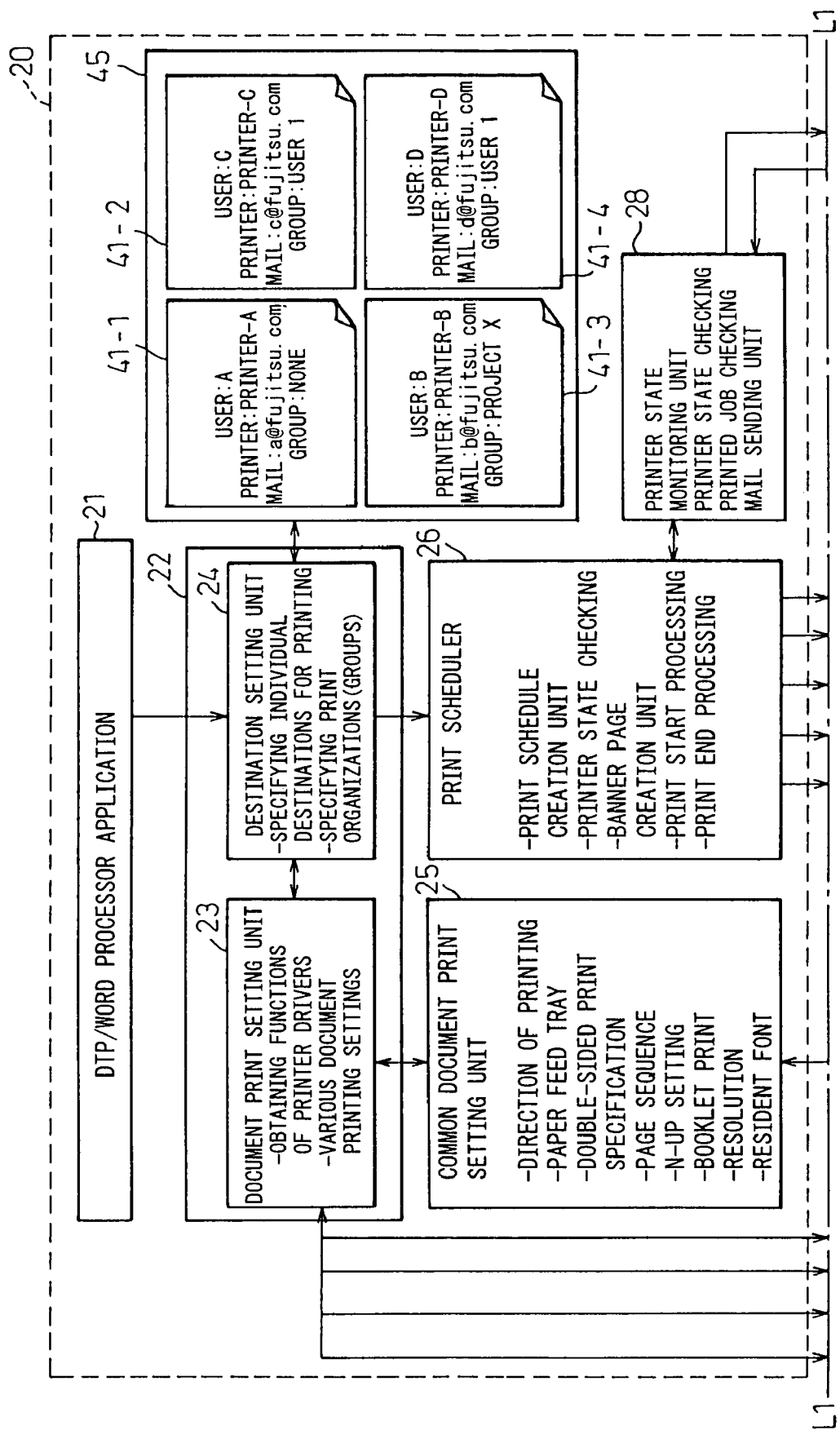

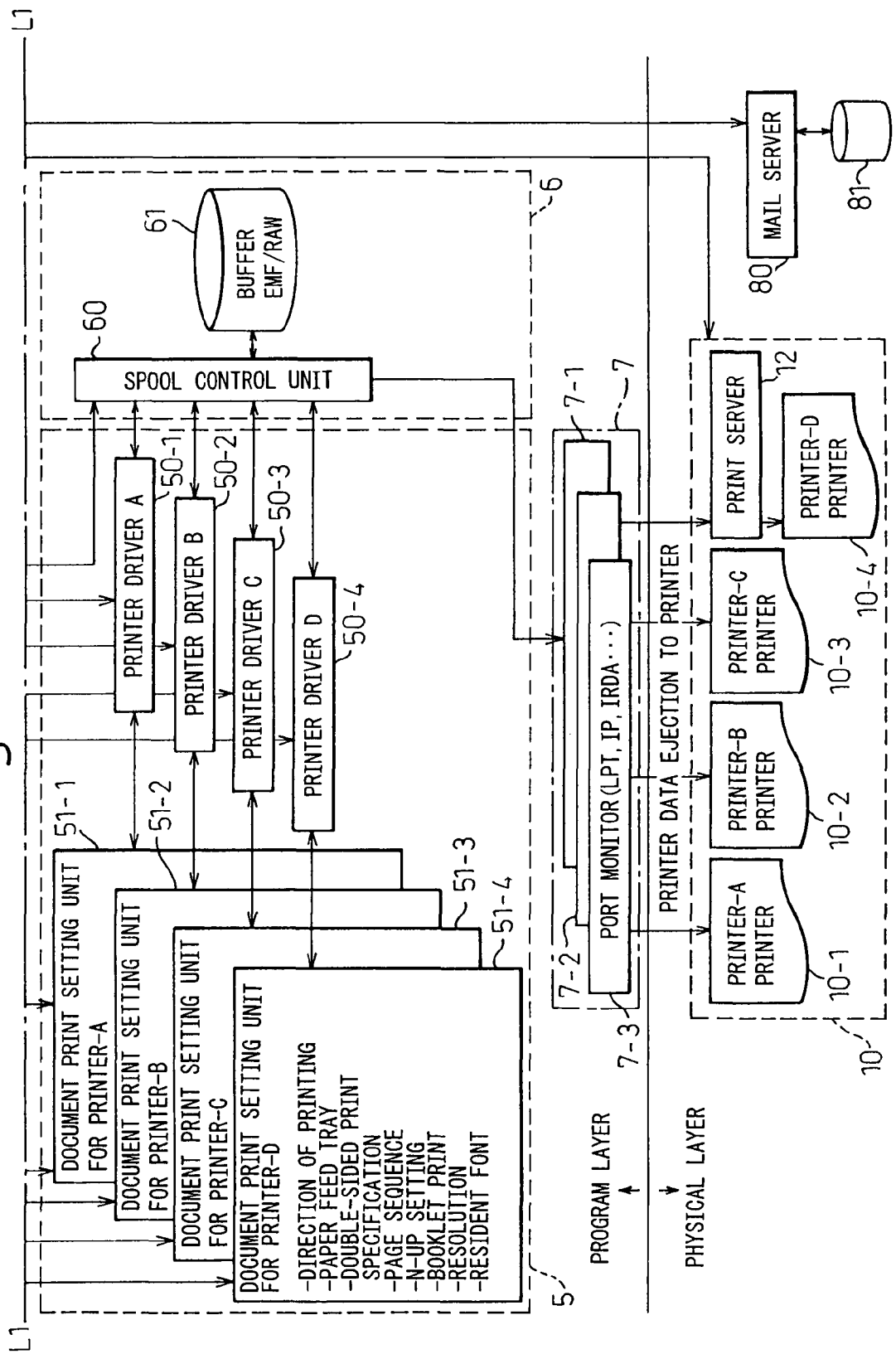

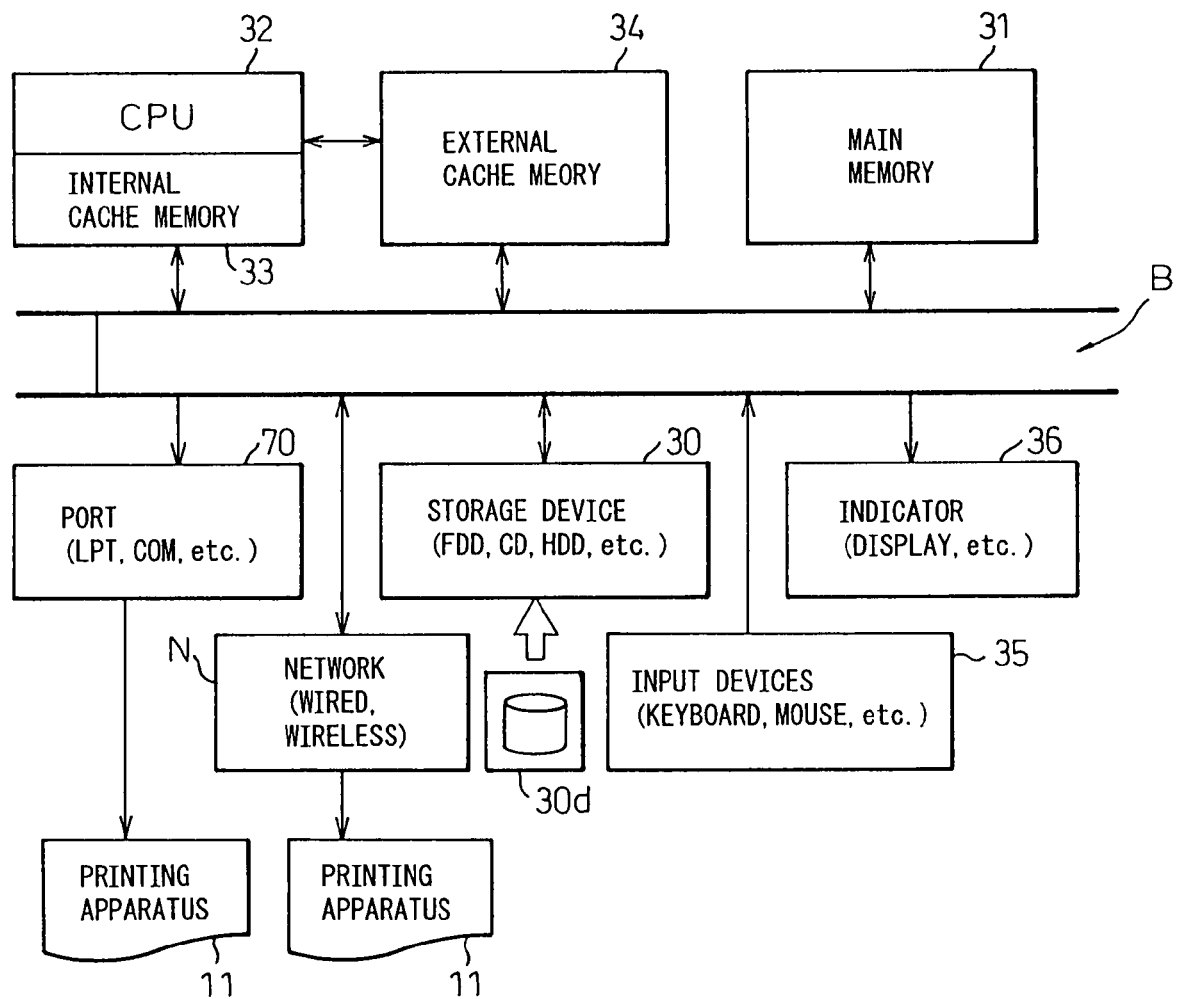

Fig.11

ASSOCIATION EDITING SCREEN (37d)

- USER NAME: GENERAL MANAGER A — NEW CREATION
- BELONGING SECTION: XXX SECTION OF XXX AFFAIRS DIVISION
- PRINTER DRIVER: PRINTER A — REFERENCE
- MAIL ADDRESS: @fujitsu.com — REFERENCE
- GROUP: NONE CONFIGURATION(L)
STANDARD SETTING
- A
- B
- GROUP 1
- GROUP 2
- GROUP 3
  - C
  - D

[OK] [CANCEL]

PAPER REGISTRATION(Y)

DOCUMENT PRINT SETTING SPECIFIC TO PRINTER DRIVER (SPECIFIC) (37e)

Tabs: PAPER | PAPER OPTION | GRAPHICS | DOUBLE-SIDED PRINTING

- PAPER SIZE(Z): A 4 (210×297mm)
- PAPER FEED METHOD(S):
- USER DEFINITION SIZE: WIDTH(W): 100 mm  HEIGHT(H): 148 mm
- VARIOUS SETTINGS(O)
- AUTOMATIC PAPER FEED SELECTION
- DIRECTION OF PRINTING:
  - ● WIDTH(P):
  - ○ LENGTH(L):
- NUMBER OF COPIES(C): 1
- ☐ COLLATED PRINTING(M):
- RESOLUTION(R): 600dpi
- HIGH SPEED MODE  ● ON
  - ● DEFAULT(N):
  - ○ FASTEST(F):
  - ○ OFF
- ALTERNATIVE TABLE REFERENCE(T)

[VERSION INFORMATION(B)] [RETURN TO DEFAULT(D)]
[OK] [CANCEL] [APPLIED(A)] [HELP]

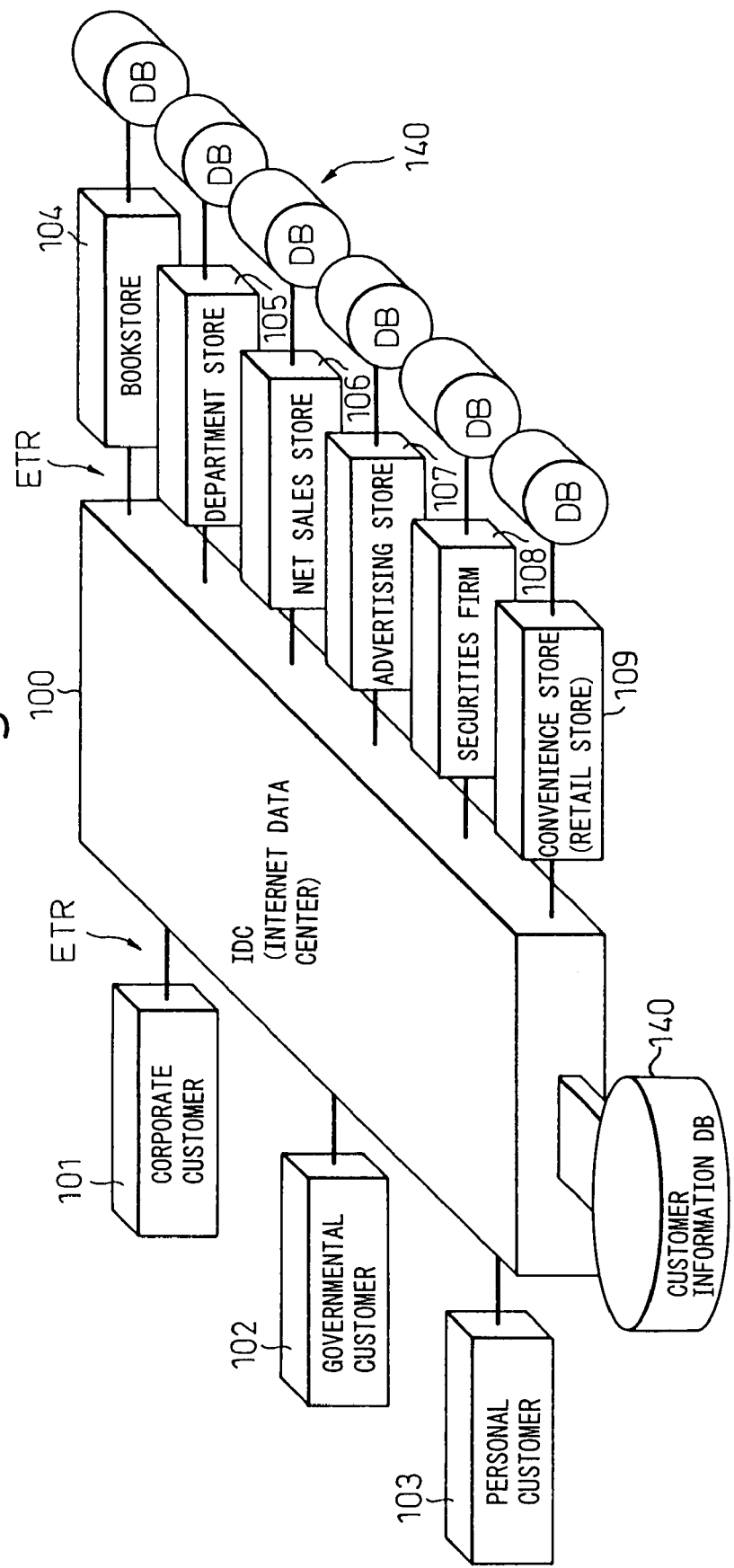

PRINT DISTRIBUTION SYSTEM AND PRINT DISTRIBUTION PROGRAM

This is a Continuation of Application No. PCT/JP01/01213 filed Feb. 20, 2001. The entire disclosure of the prior application is hereby incorporated by reference herein in its entirety.

BACKGROUND OF THE INVENTION

1. Field of the Invention

The present invention relates to a print distribution system and a print distribution program that includes plural printing apparatuses such as printers connected over a network such as the Internet, and distributes printed data created in a data processing apparatus such as personal computer owned by a sender of a sending source and printed by a specific printing apparatus to users of specified distribution destinations.

More specifically, the present invention relates to a technique for printing printed data created in a data processing apparatus of the sending source and printed by a specific printer or the like on plural printers or the like owned by plural users through the Internet to distribute the printed data to the plural users.

2. Description of Related Art

Recent development in various technologies employing the Internet such as intranet (within firewall) and extranet is remarkable. Particularly, the United States in recent years has achieved more rapid growth in technologies employing the Internet over high-speed and always-on CATV (cable television) networks and ADSL (asymmetric digital subscriber line) networks than in technologies based on Internet connection by dialup over telephone lines. Also in Japan, the merits of being high speed and always on are accepted by users and Internet environments employing cables such as CATV networks and ADSL networks are expected to expand rapidly. The term firewall refers to an access limitation function provided in a gateway or the like to protect plural apparatuses connected over the intranet from illegal invasion.

On the other hand, as network environments such as the Internet environments as described above are improving, numerous printers have been put on the market which are connectable to networks and have a print distribution function. Generally, these printers can make printers owned by specified users print printed data such as printed documents and printed materials created by some specific printers.

Further, printer are more and more miniaturized and it is commonplace to share one printer on a project basis or by a small number of users such as one to several users. Some printers have a multi-stacker function provided with stackers of plural stages (multi-stacker). Such printers having the multi-stacker function are, in some cases, used with users or projects assigned to each stacker, in cases where the distribution of electronic documents and the like is not permitted to prevent printed data from being tampered or copied by outsiders.

However, the multi-stacker function of the printers described above is optionally provided, and many printers having been so far shipped do not have the multi-stacker function. There is a problem in that printed documents, printed materials, and the like printed out in multiple stackers may be easily seen by other people. Further, the above printers having multiple stackers are often installed at physically somewhat distant places and users may feel it troublesome to go to the printed documents, printed materials, and the like.

On the other hand, although users have dedicated printers connected to networks such as the Internet, the users have not distributed printed documents, printed materials, and the like to plural users through the Internet. Conversely, in most cases, the printers have been used only for the purpose of users' own printing. Further, although the users took the trouble to copy and distribute printed documents, printed materials, and the like, they may be buried in other printed matter without being recognized. A typical example of it is printed documents, printed materials, and the like transmitted by facsimiles (FAX). Further, in cases where one printed document is distributed to plural people, if portions of the printed document are to be changed for each of print destinations (that is, each of distribution destinations), the portions to be changed must be modified for each of the print destinations. Therefore, persons responsible for sales and customer service must make the very painful effort of rewriting all destinations to create the printed document.

Also, since advertisements for bargain goods and advertisements with discount tickets are randomly distributed to customers in conjunction with newspaper, these advertisements have been useless for customers not requiring them. The same is also true of the distribution of direct mail to customers to announce new products.

As described above, to distribute printed documents, printed materials, and the like to plural people (e.g., customers) using the Internet including intranet and extranet, matters printed in large quantities with a specific printing apparatus (e.g., printer) by a sender or large-quantity copies have been hitherto distributed to customers and the like. In other words, hitherto, although plural people of distribution destinations own plural printing apparatuses (e.g., plural printers) connected to the Internet, these printers have not been sufficiently utilized.

On the other hand, technology for performing remote printing by selecting a printing apparatus having the print distribution function is described in Japanese Unexamined Patent Publication (Kokai) No. 2000-69077. In this patent application, a remote print control apparatus employing an electronic mail system on a current network is disclosed. However, remote printing by the remote print control apparatus assumes the existence of the electronic mail system and has very limited uses.

Further, the Japanese Unexamined Patent Publication (Kokai) No. 2000-69077 is basically only a description of a remote print control apparatus for printing electronic mail, and printed documents created by applications other than applications for electronic mail printing cannot be distributed for printing.

Further, since the Japanese Unexamined Patent Publication (Kokai) No. 2000-69077 requires a data analysis unit that adds a print command inside electronic mail and analyzes the print command, the remote print control apparatus is constructionally complicated.

SUMMARY OF THE INVENTION

The present invention has been made in view of the above circumstances and provides a print distribution system and a print distribution program that never fail to distribute printed data such as printed documents and printed materials created by a sender in a data processing apparatus such as a specific personal computer connected to a network such as the Internet to plural users at almost the same time without extra operations such as copying.

To solve the above problems, the print distribution system of the present invention, in which plural printing apparatuses are connected over a network, and printed data created by a data processing apparatus used in a sender is distributed to plural distribution destinations, includes: an association information holding unit that holds in advance information indicating correspondences between plural distribution destinations and plural printing apparatuses used in the plural distribution destinations; and a print setting management unit that collectively manages settings of print conditions of the plural printing apparatuses. When a request to print out the printed data is outputted to the plural distribution destinations from the sender, the print setting management unit, on the basis of information held in the association information holding unit, locates plural printing apparatuses used in plural distribution destinations specified by the sender, sets the print conditions for the plural located printing apparatuses, and activates printout of the printed data.

Preferably, in the print distribution system of the present invention, the print setting management unit has a function for setting common print conditions for plural printing apparatuses used in the plural distribution destinations.

Further, preferably, in the print distribution system of the present invention, the print setting management unit has a function for selecting whether to set print conditions specific to each of the plural distribution destinations or to set print conditions common to plural printing apparatuses used in the plural distribution destinations.

Further, preferably, the print distribution system of the present invention includes plural printed data creation apparatuses for creating printed data of the plural printing apparatuses and performing the printout.

Further, preferably, in the print distribution system of the present invention, the association information holding unit includes a database (in some cases, simply referred to as DB) recording information containing at least a sender name of the printed data, a printed data creation apparatus name corresponding to each of the plural printing apparatuses used in the plural distribution destinations, and respective mail addresses of the plural distribution destinations.

Further, preferably, the print distribution system has a function that, when a request for the printout is issued from the sender, prevents an error detected in a specific printing apparatus of the plural printing apparatuses used in the plural distribution destinations from affecting the printout of other printing apparatuses.

Further, preferably, the print distribution system of the present invention has a function that notifies the plural distribution destinations by mail at almost the same time that the printout has been started.

Further, preferably, the print distribution system of the present invention, has a function that, when an error is detected in a specific printing apparatus of the plural printing apparatuses used in the plural distribution destinations, notifies distribution destinations using the specific printing apparatus of contents of the error.

Further, preferably, the print distribution system of the present invention, has a function that, when printed data to be respectively distributed to plural distribution destinations is printed out in one printing apparatus, in order to avoid confusion of the printed data, creates additional information for each of the plural distribution destinations on the basis of information containing the sender name, the printed data creation apparatus names, and the mail addresses registered in the database.

On the other hand, there is provided a print distribution program that instructs a computer to execute: a part that locates plural printing apparatuses on the basis of information indicating correspondences between plural distribution destinations and plural printing apparatuses on a network used in the plural distribution destinations, and sets print conditions of the plural printing apparatuses for the plural located printing apparatuses; and a part that activates the plural located printing apparatuses to print out printed data according to the set print conditions.

In sum, according to the present invention, in cases where printed data created in a data processing apparatus (e.g., personal computer) owned by a sender is distributed to users of plural distribution destinations connected over a network, on the basis of information indicating correspondences between plural distribution destinations and plural printing apparatuses used in the plural distribution destinations, plural printing apparatuses owned by plural users specified by the sender can be made to print out the printed data at almost the same time.

More specifically, for each of the respective destinations of plural users, a sender name (sending source name) of printed data, plural user names, printing apparatus names (printer names) owned by the users, mail addresses of the users, and the like are associated in advance and held, and when a distribution destination (print destination) is located, mere specification (selection) of a corresponding user name enables the printed data to be printed on a printer owned by the user, and the user to be notified by mail that a document has been printed. Therefore, troubles such as unrecognized distribution of printed documents and the like can be prevented before they occur.

At this time, for users not having mail addresses, if a specified distribution name, for example, "To (destination of a printed document):", "Cc (carbon copy; destinations to which copies of a printed document are delivered to specific outsiders):", and the like are specified, "destination: xxx General Manger, copy): yyyy Manager" and the like can be printed in any position of a printed document or banner page (page for creating additional information). Therefore, it can be clearly determined from whom the printed document and the like have be delivered and to whom they are directed.

BRIEF DESCRIPTION OF THE DRAWINGS

Preferred embodiments of the present invention will be described in detail based on the followings, wherein:

FIG. 1 is a schematic diagram showing an intranet environment used in the present invention;

FIG. 2 is a block diagram showing the configuration of a print distribution system of a preferred embodiment of the present invention;

FIG. 3A is a block diagram 1 showing a concrete configuration of the embodiment of FIG. 2;

FIG. 3B is a block diagram 2 showing a concrete configuration of the embodiment of FIG. 2;

FIG. 4 is a block diagram showing an overall configuration of a computer system to which a print distribution system of the present invention is applied;

FIG. 11 is a front view 2 showing the state of print setting by a print start dialog; and FIG. 12 is a schematic diagram an example of an extranet environment used in the present invention.

DESCRIPTION OF THE PREFERRED EMBODIMENTS

Figure 5:
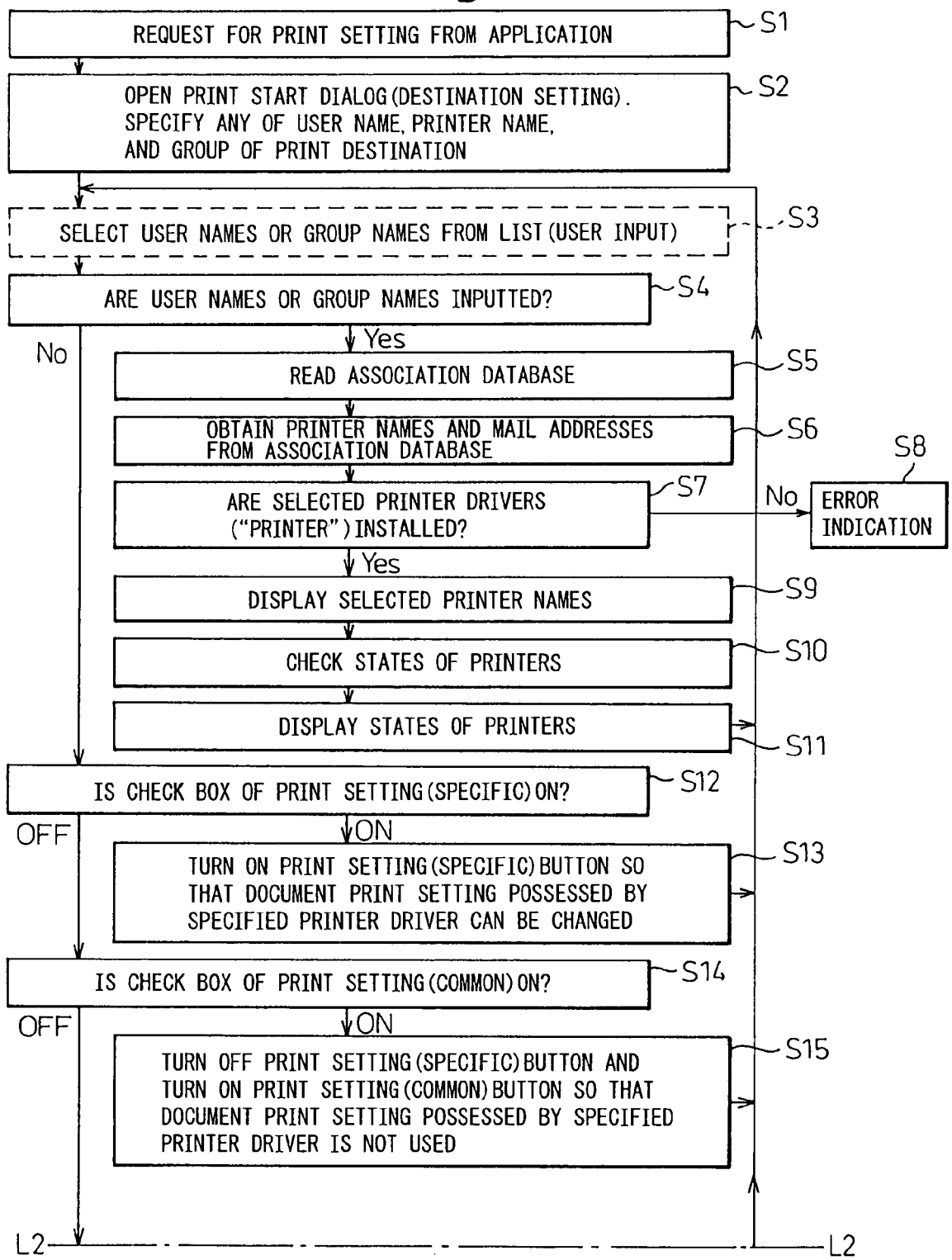
FIG. 5 is a flowchart 1 illustrating the operation of an embodiment of the present invention.

Hereinafter, referring to the accompanying drawings (FIGS. 1 to 12), descriptions will be made of an intranet environment used in the present invention, the configurations and operation of preferred embodiments of the present invention, an extranet environment used in the present invention, and the like.

FIG. 1 is a schematic diagram showing an intranet environment used in the present invention. Here, there is shown an example of a simplified intranet environment within firewall.

In the intranet environment of FIG. 1, plural printing apparatuses (e.g., printers) 1-1 to 1-4 and plural data processing apparatuses (e.g., personal computers) 3-1 to 3-6 installed on different floors within one building are connected to each other through an intranet ITR.

More specifically, on a third floor (3F) of the building are installed a printing apparatus 1-1 of printer name "printer-d" and a data processing apparatus 3-1 owned by a sender E of a transmitting source, as well as a printing apparatus 1-2 of printer name "Printer-a" and a data processing apparatus 3-2 owned by a receiver (user) A of a distribution destination, and a printing apparatus 1-3 of printer name "Printer-b" and a data processing apparatus 3-3 owned by a receiver B of a distribution destination.

On the other hand, on a second floor (2F) of the building are installed a data processing apparatus 3-4 owned by a receiver C of distribution destination and a data processing apparatus 3-5 owned by a receiver D, as well as a printing apparatus 1-4 of printer name "Printer-c" owned by the receiver C and the receiver D. All the printing apparatuses and data processing apparatuses on the second and third floors are connected to each other through the intranet ITR.

In the print distribution system of the present invention realized in such an intranet environment, the data processing apparatuses owned by the sender E are provided with an association information holding unit (described later in FIG. 2) that holds in advance information indicating correspondences between the user names (e.g., A, B, C, and D) of plural receivers and the printer names ("Printer-a", "Printer-b", and "Printer-c") of plural printing apparatuses owned by the receivers, and a print setting management unit (described later in FIG. 2) that collectively manages settings of print conditions of the plural printing apparatuses. The association information holding unit and the print setting management unit serve as main components of the present invention, and are more preferably realized by an application, a sort of software of personal computers.

To run the print distribution system of the present invention in the intranet environment as described above, the sender E specifies plural receivers of distribution destinations of printed data 2-1 printed by the printing apparatus 1-1 of the printer name "Printer-d". Next, from the association information holding unit, information indicating correspondences between the user names of plural receivers and the printer names of plural printing apparatuses owned by the receivers is extracted, and based on the information, plural printing apparatuses owned by receivers specified by the sender are located. In this case, printing apparatuses can be located by specifying user names, whether they are personally used (e.g., "Printer-a" and "Printer-b") or used in common (e.g., "Printer-c"). The printing apparatuses located in this way can be easily made to print out printed data 2-2, 2-3, 2-4, and 2-5 at almost the same time for each of the receivers.

Further, by holding in advance the respective mail addresses (e.g., electronic mail addresses) of plural receivers in the association information holding unit, plural located receiving apparatuses can be notified by mail that printed data has been printed.

FIG. 2 is a block diagram showing the configuration of a print distribution system of a preferred embodiment of the present invention. In the drawing, the configuration of main portions of the print distribution system of the embodiment is shown. Components in this drawing and following drawings that are identical to the components described previously are identified by the same reference numbers.

In a print distribution system of an embodiment of FIG. 2, like the above-described case of FIG. 1, plural printing apparatuses (e.g., plural printers) including the printing apparatus 1-2 of "Printer-a", the printing apparatus 1-3 of "Printer-b", and the printing apparatus 1-4 of "Printer-c" are connected to each other through the Internet IT. Further, like the above-described case of FIG. 1, data processing apparatuses (e.g., personal computers) owned by plural receivers are also connected to each other through the Internet IT. Here, for the sake of simplicity, only the data processing apparatus 3-1 owned by the receiver A is representatively shown. Further, a printing apparatus and a data processing apparatus owned by the sender are also removed from the drawing for the sake of simplicity.

Preferably, in the data processing apparatus and the like owned by the sender in the print distribution system of FIG. 2, there are provided a print control unit 4 that controls the printout of printed data 2-2 to 2-4 by the plural printing apparatuses 1-2 to 1-4 according to a printout request from the sender, and a printed data creation unit 5 that includes plural printed data creation apparatuses 5-1 to 5-3 to create printed data 2-2 to 2-4 for the plural printing apparatuses 1-2 to 1-4. Preferably, the above-described print control unit 4 is realized by a print setting application, software of personal computers as described later.

More specifically, the print control unit 4 has an association information holding unit 40 that holds in advance information indicating correspondences between the user names (e.g., A, B, C, and D) of plural receivers and the printer names ("Printer-a", "Printer-b", and "Printer-c") of plural printing apparatuses 1-2 to 1-4 owned by the receivers. The association information holding unit 40, which is referred to as an association file, can hold mutually associated information of a sender name of the printed data 2-1, the printer driver names of plural printed data creation apparatuses 5-1 to 5-3 respectively corresponding to plural printing apparatuses 1-2 to 1-4 owned by plural receivers, and port names for transferring printed data. If plural users are to be notified by mail of the distribution of printed data, it is desirable to hold the mail addresses of the plural users in the association information holding unit 40.

Further, the print control unit 4 has a print setting management unit 42 that collectively manages settings of print conditions of the plural printing apparatuses 1-2 to 1-4 to meet printout requests from the sender. The print setting management unit 42, to distribute printed data 2-1 created by the sender to plural receivers, locates plural printing apparatuses 1-2 to 1-4 owned by plural receivers specified by the sender on the basis of information held in the association information holding unit 40, and sets the above print conditions at almost the same time for the plural printing apparatuses 1-2 to 1-4 thus located to instruct them to print the printed data 2-2 to 2-4.

The print control unit 4 also has: an additional information creation unit 44 that creates additional information (additional data) such as plural distribution destinations to be printed in a banner page or in the margins of printed data form; a printed data creation apparatus assignment unit 46 that assigns plural printed data creation apparatuses 5-1 to 5-3 to plural located printing apparatuses 1-2 to 1-4, respectively; and a mail creation unit 48 that creates mail text indicating that printout by the plural printing apparatuses 1-2 to 1-4 has been started. The additional information creation unit 44, to avoid confusion of printed data respectively distributed to plural receivers, creates the above-described additional information for each of the plural users on the basis of information such as sender name, user name, printer name, printer driver name, port name, and mail address registered in the association information holding unit 40.

Further, the print distribution system of FIG. 2 is provided with: a printed data creation unit 5 that includes the above-described plural printed data creation apparatuses 5-1 to 5-3; a print spooler 6 that temporarily stores printed data delivered from the printed data creation unit 5; and a port monitoring unit 7 that transfers printed data fetched from the print spooler 6 to the printing apparatuses through the Internet IT. The printed data creation apparatuses 5-1 to 5-3 create printed data for the printing apparatus 1-2 of "Printer-a", the printing apparatus 1-3 of "Printer-b", and the printing apparatus 1-4 of "Printer-c", respectively.

Since the receivers C and D share the printing apparatus 1-4, it is to be noted that the print spooler 6 temporarily stores about twice more data in a portion storing printed data delivered from the printed data creation apparatus 5-3 than in other portions. The port monitoring unit 7 monitors printers on the Internet IT and transfers printed data according to an Internet protocol of a network layer such as IP:172.xx.xx.100.

Further, the print distribution system of FIG. 2 is connected through the Internet to a mail sending unit 8 that includes SMTP (simple mail transfer protocol) for transferring mail created in the mail creation unit 48 through the Internet IT, and a mail server 80 that distributes mail transferred from the mail sending unit 8 to plural receivers.

In the print control unit 4 of the print distribution system as described above, when the sender issues a request to print out the printed data 2-1, usually, a screen for selecting printing apparatuses is displayed as a print start dialog. The print start dialog is configured to allow specification of users (receivers) to whom printed data such as printed documents and printed materials is to be distributed. In this case, if the printed data is to be distributed to the plural users, the individual users may be specified. The user names of the users are defined in advance, and associated with printing apparatuses (or print control apparatuses) used by the users. If notification by mail distribution is to be made at almost the same time, mail addresses may also be associated in advance with the user names.

Upon receipt of a request for printout from the sender, the print control unit 4 refers to the association file and obtains printer names, printer driver names, port names, and mail addresses corresponding to specified user names. On the basis of the obtained information, the additional information creation unit 44 creates additional data (e.g., overlay data) to be printed in a banner page or in the margins of form. The created additional data is passed to the printed data creation apparatus assignment unit 46 together with a document file of printed data. The printed data creation apparatus assignment unit 46 detects printed data creation apparatuses corresponding to specified printing apparatuses, checks whether the printed data creation apparatuses are active, and then activates pertinent printed data creation apparatuses to print out the additional data and document file.

In the printing distribution system of FIG. 2, first, the printed data creation apparatus 5-1 to create printed data of the printing apparatus of "Printer-a" is activated. Next, the printed data creation apparatus 5-2 to create printed data of the printing apparatus of "Printer-b" and the printed data creation apparatus 5-3 to create printed data of the printing apparatus of "Printer-c" are activated. To enable a wide range of support by many existing printing apparatuses such as printers and avoid influence by printer emulation (that is, printer language), the printed data made up of additional data and a document file is processed on a job basis. The above-described plural printed data creation apparatuses edit received printed data, then deliver the edited data to the print spooler 6. The printed data stored in the print spooler 6 is transferred to ports assigned to the respective printed data creation apparatuses, when printout by the plural printing apparatuses is actually started. When processing of the respective printed data creation apparatuses is started, mail sending requests are issued to the mail creation unit 48. Mail created in the mail creation unit 48 is automatically sent to specified users through the mail sending unit 8 and the mail server 80.

According to the above embodiment, on the basis of information indicating correspondences between the user names of plural users and the printer names of plural printing apparatuses, by activating plural printed data creation apparatuses specified in the printed data creation apparatus assignment unit 46, plural printing apparatuses can be easily made to start the printout of printed data. Further, since it can be notified by mail that the printout of printed data by plural printing apparatuses has been started, troubles such as unrecognized distribution of printed documents and the like can be prevented before they occur.

Preferably, the print control unit 4 in the above embodiment is provided with a function, upon detection of an error in a specific printing apparatus of plural printing apparatuses owned by plural users, for preventing influence on printout operation of other printing apparatuses by skipping the specific printing apparatus.

Further, preferably, the print control unit 4 in the above embodiment is provided with a function, upon detection of an error in a specific printing apparatus of the plural printing apparatuses, for notifying the user of the specific printing apparatus of the contents of the error.

FIGS. 3A and 3B are block diagrams 1 and 2 showing a concrete configuration of the embodiment of FIG. 2. FIG. 3A shows a concrete configuration of the print control unit 4 (see FIG. 2) characterizing the present invention. FIG. 3B shows a concrete configuration of other portions.

In FIG. 3A, the print control unit 4 (see FIG. 2) is realized by a print setting application 20, which is software of personal computers. More specifically, the print setting application 20 has a DTP (desktop publishing)/word processor application 21 used to create printed data corresponding to various documents (printed documents) by the sender, and a print start dialog 22 for starting printout operation of plural printing apparatuses (e.g., printers) by specifying information required to distribute printed data created by the sender to plural users, common basic information, and destination-specific attribute information of the printed data. The print start dialog 22 includes a document print setting unit 23 that has a function for obtaining functions common to plural printed data creation apparatuses (e.g., printer drivers) and a function for setting print conditions specific to destinations of the printed data, and a destination setting unit 24 that specifies the user names of individual destinations and destinations of print organizations (groups) of the printed data.

Further, the print setting application 20 has a common document print setting unit 25 that sets print conditions common to plural printing apparatuses owned by users of plural destinations, and a print scheduler 26 that creates basic information common to the printed data and destination-specific attribute information of the printed data as a print schedule.

Common print conditions set in the common document print setting unit 25 include the direction of printing of documents, paper feed tray, double-sided print specification, page sequence, n-UP print setting for printing n pages (n is a positive integer of 2 or greater) on one sheet of paper, booklet print to which the double-sided print mechanism and 2-UP print setting of two pages are applied, resolution, and conditions on resident fonts incorporated in the apparatuses. According to the resident fonts, since printout is enabled only by feeding only character codes from a personal computer of a host to the printing apparatuses rather than feeding character images to the printing apparatuses, printing is generally sped up.

Further, the print scheduler 26 creates basic information common to documents as well as attribute information for each of destinations of the documents such as information about the results of checking the state of printer in each of the plural printing apparatuses (e.g., printers), the creation of banner page, and print start processing and print end processing.

Preferably, the print setting management unit 42 is realized by the print start dialog 22, the common document print setting unit 25, and the print scheduler 26. Further, preferably, the additional information creation unit 44 in FIG. 2 is realized by a banner page creation unit within the print scheduler 26. The printed data creation apparatus assignment unit 46 in FIG. 2 is realized by a print schedule creation unit within the print scheduler 26.

Further, the print setting application 20 has an association database (may be simply referred to as a association DB) 45 including plural databases as the association information holding unit 40 in FIG. 2. The association database 45 includes different databases 41-1, 41-2, 41-3, and 41-4 for different users. These databases store mutually associated information of user names (e.g., A, B, C, and D) of plural users, printer names ("Printer-a", "Printer-b", "Printer-c", and "Printer-d") of plural printing apparatuses (e.g., printers) owned by the users, mail addresses (a@fujitsu.com, b@fujitsu.com, c@fujitsu.com, and d@fujitsu.com), and group names (unnamed, "Project-x", and "User 1").

Further, as the mail creation unit 48 and the mail sending unit 8 of FIG. 2, the print setting application 20 has a printer state monitoring unit 28 that monitors the states of plural printers after the printout of printed data has been started. Generally, when printout by plural printer drivers has been started, processing by the print setting application 20 terminates. However, since the printers perform printing at a comparatively slow speed, printout operation of the plural printers continues even after processing by the print setting application 20 has terminated. Therefore, the printer state monitoring unit 28 checks the states of the plural printers until printout operation of the printers terminates.

Further, the printer state monitoring unit 28 checks print jobs executed on a job basis and sends mail to notify plural users that the printout has been started.

On the other hand, in FIG. 3B, the printed data creation unit 5 has: plural printer drivers (in FIG. 3B, printer driver a 50-1, printer driver b 50-2, printer driver c 50-3, and printer driver d 50-4) that create printed data for plural printers of printer names "Printer-a", "Printer-b", "Printer-c", and "Printer-d"; and document print setting unit 51-1 for the printer driver a, document print setting unit 51-2 for the printer driver b, document print setting unit 51-3 for the printer driver c, and document print setting unit 514 for the printer driver d that respectively set different print conditions for the plural printer drivers.

The document print setting unit 23 selects whether a different print condition is set for each of the plural printer drivers (or printed data creation apparatuses) in the individual document print setting units 51-1 to 51-4, or common print conditions are set for the plural printer drivers in the common document print setting unit 25 as described previously. The contents of print conditions in each of the document print setting units 51-1 to 51-4 are the same as the contents of print conditions in the common document print setting unit 25; a detailed description of them is omitted.

Further, in FIG. 3B, the print spooler 6 has buffer 61 that temporarily stores printed data delivered from the plural printer drivers 50-1 to 50-4, and a spool control unit 60 for controlling it. In the buffer 61, printed data of EDF (enhanced meta-format) and printed data of RAW format are stored.

Further, in FIG. 3B, the port monitoring unit 6 has plural port monitors 7-1, 7-2, 7-3, and 7-4 which respectively monitor the transfer of printed data delivered via the spool control unit from the plural printer drivers 50-1 to 50-4 to the printers by predetermined ports. Such predetermined ports include IP (Internet protocol) port as described previously, LPT (parallel port) primarily used to transfer printed data to printers, and IRDA (infrared data association) port related to specifications of infrared data communication apparatuses and such data communications. The components having been so far described on the basis of FIGS. 3A and 3B are all constituted by the program layer. On the other hand, a printing apparatus group 10 and a mail server 80 are all constituted by the physical layer.

The printing apparatus group 10 in FIG. 3B has plural printers 10-1, 10-2, 10-3, and 10-4 of printer names "Printer-a", "Printer-b", "Printer-c", and "Printer-d", and a print server for controlling the printout operation of these printers. For the sake of simplicity, only a print server 12 for controlling the operation of the printer 10-4 of "Printer-d" is representatively shown. On the other hand, mail respectively distributed to plural users from the mail server 80 is stored in a mail storing unit 81.

FIG. 4 is a block diagram showing an overall configuration of a computer system to which a print distribution system of the present invention is applied.

The print control unit 4 (see FIG. 2) characterizing the print distribution system of the present invention becomes executable by the CPU (central processing unit) 32 of personal computers and the like. A program of the print setting application of the present invention is software stored in a computer-readable recording medium 30d such as floppy disk and hard disk, and loaded into a main memory 31, upon an activation request from a host personal computer. The recording medium 30d is mounted in a floppy disk drive (FDD), hard disk drive (HDD), or compact disk (CD) drive, and a desired program is loaded into the main memory 31 through the bus line B.

The computer-readable recording medium 30d as described above stores a unit that locates plural printing apparatuses 11 on the basis of information indicating correspondences between plural users and plural printing apparatuses owned by the plural users on a network N (wired or wireless), and sets print conditions of the plural located printing apparatuses 11 in the plural located printing apparatuses 11 at almost the same time, and a unit that activates the plural located printing apparatuses 11 to print out printed data at almost the same time according to the set print conditions.

On the other hand, in the case where the print distribution system of the preferred embodiment of the present invention is run using the computer-readable recording medium 30d, it is desirable to prepare a print distribution program for instructing a computer to execute a part that locates plural printing apparatuses 11 on the basis of information indicating correspondences between plural distribution destinations and plural printing apparatuses used in the plural distribution destinations on a network N, and sets print conditions of the plural located printing apparatuses 11 in the plural located printing apparatuses 11 at almost the same time, and a part that activates the plural located printing apparatuses 11 to print out printed data at almost the same time according to the set print conditions.

The program loaded into the main memory 31 as described above is executed on the CPU 32, a cache memory 33 incorporated in the CPU 32, and an external cache memory 34, and can perform the setting of print distribution functions through a user interface by a display unit 36 and an input apparatus 35 such as keyboard or mouse. Then, according to the setting from the user interface, printed data is distributed to printing apparatuses 11 via different types of ports such as an LPT port primarily used to transfer data to a printer and a COM port for performing data communications in serial format, or the network N.

FIGS. 5, 6, 7, and 8 are flowcharts 1, 2, 3, 4 for explaining the operation of the embodiment of the present invention. Here, a description will be made of a series of operations of print distribution performed by the print setting application shown in FIG. 3.

First, as shown in step S1 of FIG. 5, according to a printout request from a sender, the print setting application receives a request to set print conditions of printed data corresponding to a document. Next, in the screen for selecting printing apparatuses, the print start dialog (destination setting) is opened to specify any of user names, printer names, and group names of plural destinations of the printed data (step S2).

Further, the user (that is, the sender) of the sending source selects user names or group names on the basis of a list containing correspondences between the user names of plural destinations and plural printers used in the plural destinations (step S3).

Further, the print setting application checks whether user names or application names have been inputted (step S4). If it is confirmed that user names or application names have been inputted, data is read from the association database (step S5), and printer names and mail addresses are obtained from the association database (step S6). It is determined whether selected printer drivers ("Printer") have been installed (step S7).

If the selected printer drivers have not been installed, the occurrence of an error is indicated (step S8). If the selected printer drivers have been installed, the printer names of printers corresponding to the selected printer drivers are displayed (step S9). The states of the printers are checked (step S10), and displayed (step S11).

If user names or group names are not inputted in the step S4, it is checked whether the check box of print setting (specific) is on (step S12). If the check box of print setting (specific) is on, the print setting (specific) button is turned on so that document print setting possessed by a specified printer driver can be changed (step S13).

If the check box of print setting (specific) is off in the step S12, it is checked whether the check box of print setting (common) is on (step S14). If the check box of print setting (common) is on, the print setting (specific) button is turned off and the print setting (common) button is turned on so that document print setting possessed by the specified printer driver is not used (step S15).

Figure 6:
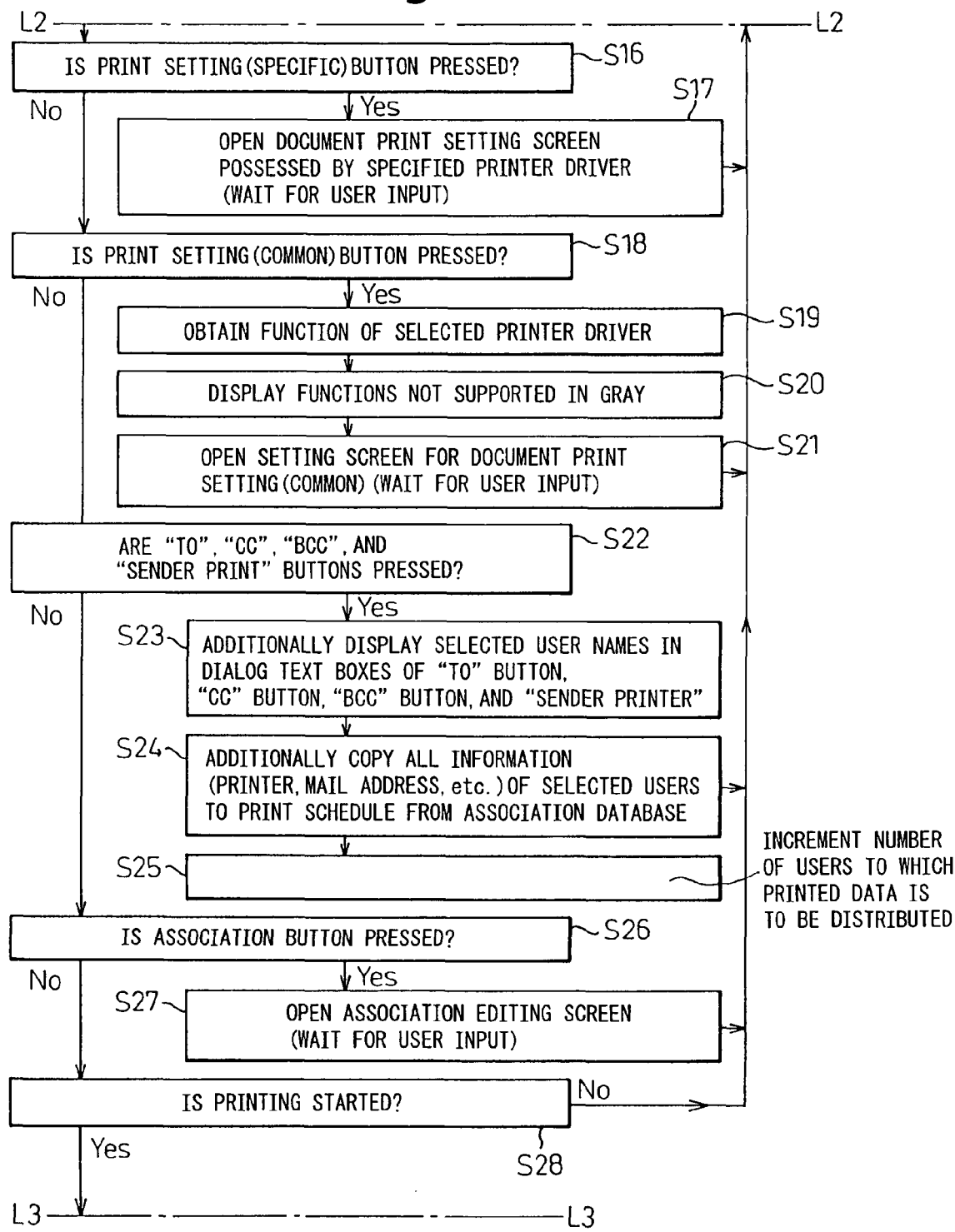
FIG. 6 is a flowchart 2 illustrating the operation of an embodiment of the present invention.

If the check box of print setting (common) is off in the step S14, it is determined whether the print setting (specific) button has been pressed, as shown in step S16 of FIG. 6. If the print setting (specific) button has been pressed, a document print setting screen possessed by the specified printer driver is opened to wait for user input (step S17).

If the print setting (specific) button has not been pressed in the S16, it is determined whether the print setting (common) button has been pressed (step S18). If the print setting (common) button has been pressed, the function of a selected printer driver is obtained (step S19), and functions not supported are displayed in gray (step S20). Further, a setting screen for document print setting (common) is opened to wait for user input (step S21).

It is determined whether "To" button, "Cc" button, "Bcc" (blind carbon copy: when copies of printed documents are delivered to plural destinations, destinations of other than receivers are hidden) button, and "sender print" button have been pressed (step S22). If the "To" button, "Cc" button, "Bcc", button, and "sender print" button have been pressed, selected user names are additionally displayed in dialog text boxes of the portions of "To" button, "Cc" button, "Bcc" button, and "sender printer" (step S23).

Further, all information (printer, mail address, etc.) of selected users is additionally copied to the print schedule from the association database (step S24). Thereafter, the number of users to which printed data is to be distributed is incremented (step S25).

If the "To" button, "Cc" button, "Bcc" button, and "sender print" button have not been pressed in the step S22, it is determined whether an association button has been pressed (step S26). If the association button has been pressed, an association editing screen is opened to wait for user input (step S27). If the association button has not been pressed in the step S26, it is determined whether printing has been started (S28).

Figure 7:
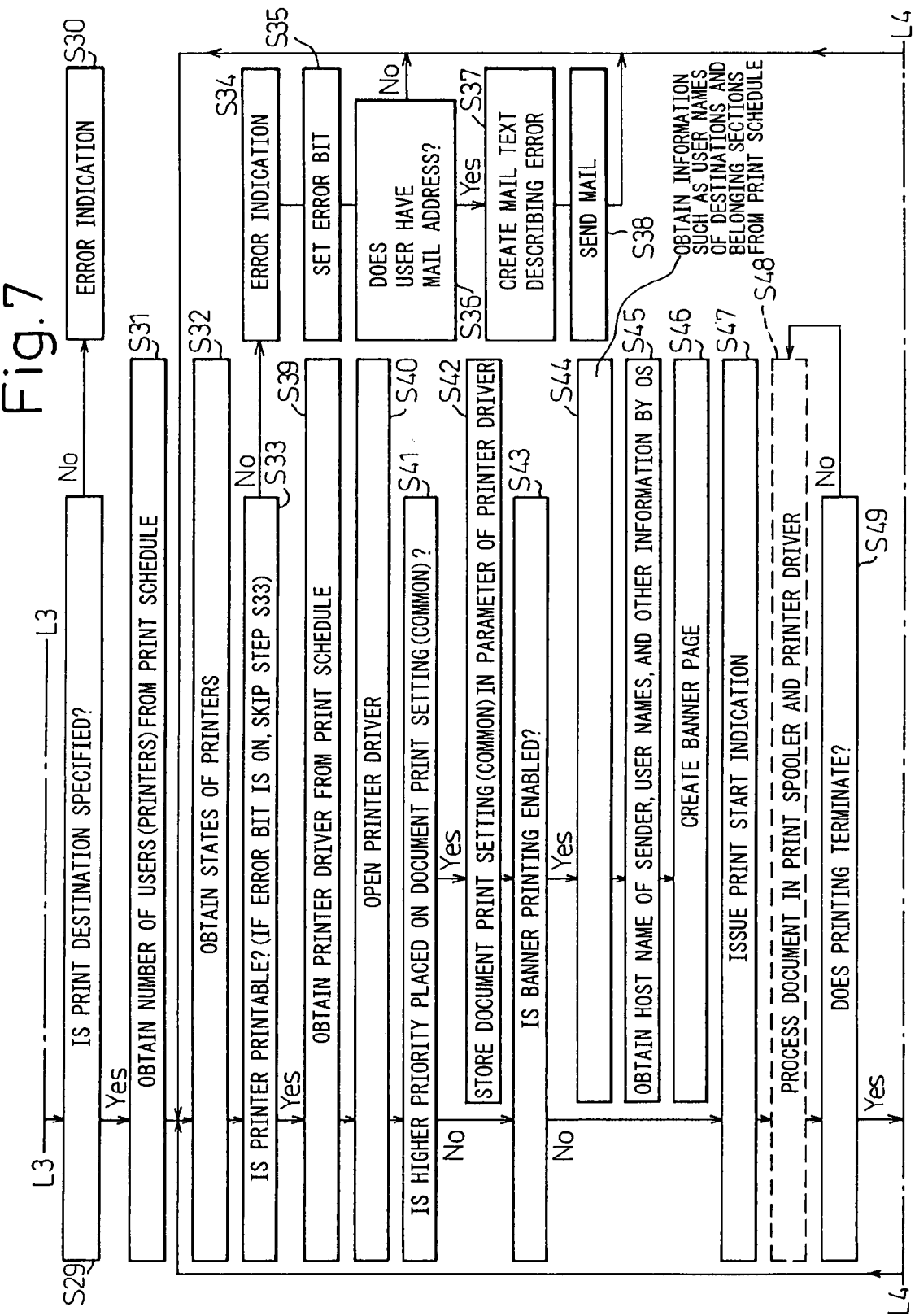
FIG. 7 is a flowchart 3 illustrating the operation of an embodiment of the present invention.
Figure 8:
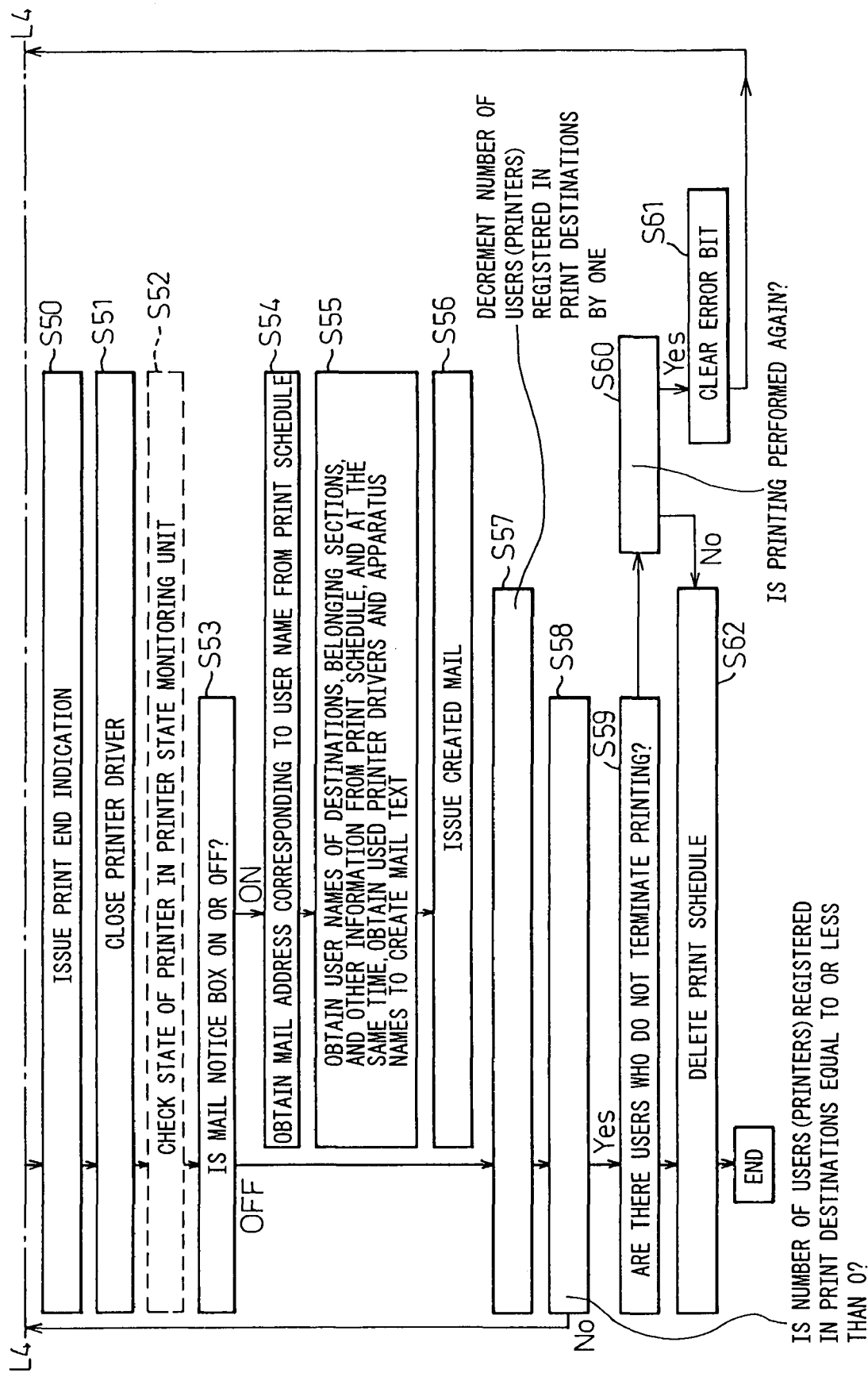
FIG. 8 is a flowchart 4 illustrating the operation of an embodiment of the present invention.

If printing has been started, it is determined whether "print destination" (that is, distribution destination of printed data) has been set as shown in S29 of FIG. 7 (step S29). If "print destination" has not been set, the occurrence of an error is indicated (step S30). On the other hand, if "print destination" has been set, the number of users (or printers) is obtained from the print schedule, and the states of printers are obtained (steps S31 and S32).

It is determined whether a printer is printable at this time (step S33). If an error bit is already on, the step S33 is skipped. If the printer is not printable, the occurrence of an error is indicated (step S34), and an error bit is set (step S35). It is determined whether the user has a mail address (step S36). Further, mail text describing the error is created (step S37) and the mail is sent (step S38).

If the printer is printable in the step S33, a printer driver is obtained from the print schedule and opened (steps S39 and S40).

At this time, it is determined whether higher priority is to be placed on document print setting (common) (step S41). If higher priority is to be placed on document print setting (common), the document print setting (common) is stored in a parameter of the printer driver.

If higher priority is not placed on document print setting (common) in the step S41, it is checked whether banner printing is enabled (step S43). If banner printing is enabled, information such as the user names of destinations and belonging sections is obtained from the print schedule (step S44). Then, the host name of the sender, information of user names, and other information are obtained by the OS (operation system) (step S45) and banner pages are created (step S46).

If banner printing is enabled in the step S43, print start indication is issued (step S47) and the document is processed in the print spooler and the printer driver (step S48). Further, it is checked whether document printing has terminated (step S49).

If document printing has terminated, print termination indication is issued as shown in step. S50 of FIG. 8 and the printer driver is closed (step S51). Thereafter, the state of the printer is checked in the printer state monitoring unit (step S52).

It is checked whether the mail notice box is on (step S53). If the mail notice box is on, a mail address corresponding to a user name is obtained from the print schedule (step S54).

Further, the user names of destinations, belonging sections, and other information are obtained from the print schedule, and at the same time, used printer drivers and apparatus names are also obtained to create mail text (step S55). Thereafter, created mail is issued (step S56).

If the mail notice box is not on (step S53), the number of users (or printers) registered in print destinations is decremented by one (step S57). It is checked whether the number of users (or printers) registered in the print destinations is equal to or less than 0 (step S58).

If the number of users (or printers) registered in the print destinations is greater than 0, since it means that there are remaining printers to which print start indication is not issued, the operation of the steps S32 to S57 is executed again. If the number of users (or printers) registered in the print destinations is 0 or less (step S58), it is checked whether there are users who do not terminate printing (step S59).

If there are users who do not terminate printing, it is determined whether printing is performed again. If printing is performed again, the error bit is cleared (steps S60 and S61), and the operation of the steps S32 to S57 is performed again.

In cases where there are no users who do not terminate printing in the step S59, and even users who do not terminate printing do not perform printing again, the print schedule is deleted (step S62) and the print distribution operation is terminated.

Figure 9:
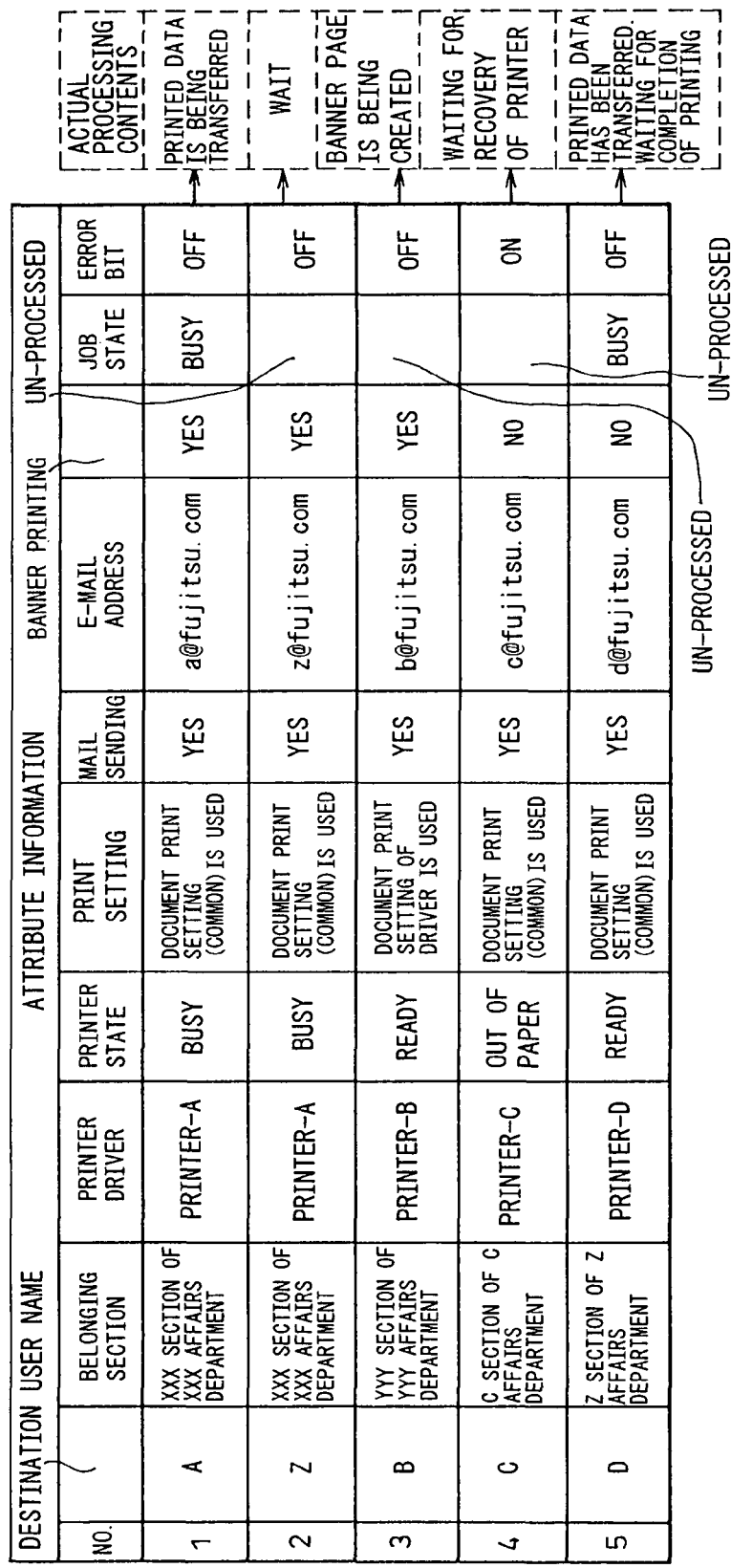
FIG. 9 is a diagram showing a data format of a print schedule.

FIG. 9 is a diagram showing a data format of a print schedule. Here, a representative example of print schedule created in the print scheduler shown in FIG. 3A is shown.

The print schedule shown in FIG. 9 is made up of two parts: basic information common to documents, and attribute information set for each of plural destinations of documents. Each time a sender makes a request for document printout, one print schedule containing the basic information and attribute information is created.

An example of FIG. 9 shows a print schedule in a case where a document (printed data) containing the minutes of a meeting is printed in four printers owned by five receivers (users) according to a request for a document printout from a sender.

There is provided basic information including "title: "the minutes of a meeting"", "file name: "gijiroku.doc"", "print date: Jan. 1, 2000", "sender name: "Taro Fujitsu", and "print count: 5."

On the other hand, there is provided attribute information including: user names (A, Z, B, C, and D) of document destinations; belonging sections (e.g., Yyyy Section of Xxx Affairs Department, Yyy part of Yyy Affairs Department, . . . ); printer drivers ("Printer-a", "Printer-b", "Printer-c", and "Printer-d"); printer states (e.g., printing, ready, out of paper); and print setting (use of document print setting (common), use of document print setting of printer driver).

Further, there is provided attribute information corresponding to mail distribution functions including: mail delivery; mail address (a@fujitsu.com, z@fujitsu.com, b@fujitsu.com, c@fujitsu.com, and d@fujitsu.com); banner printing (on or off); job state (printing or unprocessed); and error bit (OFF or ON).

Further, in a lower right field of FIG. 9, actual processing of a printer owned by each user is displayed. Here, in the printer ("Printer-a") owned by the users A and Z, for the user A, "Printed data is being transferred." is displayed, while, for the user Z, "Wait" is displayed. For the user B, "Banner page is being created." is displayed. For the user C, "The system is waiting for recovery of the printer." is displayed. For the user D, "Printed data has been transferred and the system is waiting for completion of the printing." is displayed.

Figure 10:
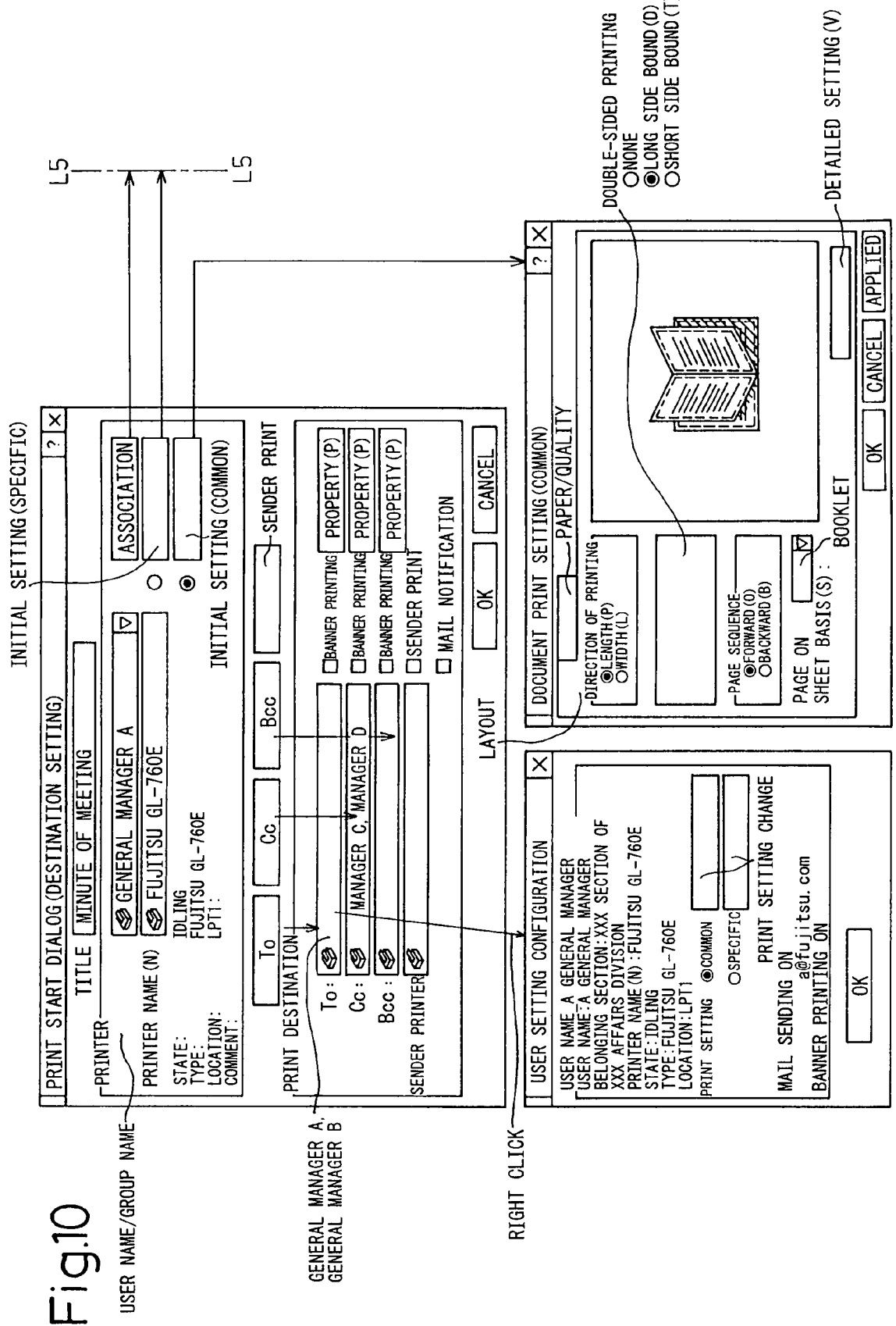
FIG. 10 is a front view 1 showing the state of print setting by print start dialog.

FIGS. 10 and 11 are front views 1 and 2 showing the state of print setting by a print start dialog.

FIG. 10 illustrates print start dialog for specifying print destinations (corresponding to destinations or distribution destinations) of printed data. In a printer specification frame of the print start dialog, a print destination of printed data is specified with a printer name or user name/group name, and in "To:", "Cc:", and "Bcc:" buttons, plural users can be added to print destinations. Thereby, plural print destinations can be specified at the same time. If the printed data is to be printed with a sender's own printer, the printer can be added by a "sender print" button.

When a user name is specified by clicking the right button of the mouse, making a user setting configuration screen as shown in FIG. 10 appear and synchronously display a printer name corresponding to the user name would provide a friendly interface (I/F). When specified print setting values of the printer are to be changed, pressing a print setting button causes a document print setting (specific) screen specific to the printer driver as shown in FIG. 11 to be displayed so that print setting values can be changed.

If it is cumbersome to change all print setting values of individual printers, enabling a radio box of a print setting (common) button causes a document print setting (common) screen as shown in FIG. 10 to be displayed so that printing can be performed with print setting values common to all printers. Changeable print setting values common to the printer drivers are parameters basic to printing. Although new users can be registered using the association editing screen as shown in FIG. 11 displayed when the association button is pressed, it would be better to provide a new interface.

In the print start dialog of FIG. 10, by selecting the banner printing check box, the sender and destinations of printed matters can be printed in a banner page and obtained additional information can also be printed. Further, by the additional information creation unit (see FIG. 2), a different banner page can be printed for a different destination. All print destinations of printed data must be specified before the printout of the printed data is started by the OK button.

FIG. 12 is a schematic diagram showing an extranet environment used in the present invention. Here, there is shown a simplified example of an extranet environment in which printed materials such as press advertisements are distributed to plural external customers connected to each other through the extranet.

In the extranet environment of FIG. 12, external plural customers are connected to an Internet data center (IDC) 100 through the extranet ETR. The plural customers include corporate customer 101, governmental customer 102, personal customer 103, bookstore 104, department store 105, net sales store 106, advertising store 107, security firm 108, convenience store (retail store) 109, and the like.

In the extranet environment of FIG. 12, although not shown, plural printing apparatuses respectively owned by plural customers are connected on the extranet. There is provided a customer information database (in FIG. 12, referred to as a customer information DB or simply as DB) 140 containing various information about each of plural customers.

In the print distribution system of the present invention realized in the extranet environment of FIG. 12, the Internet data center 100 and the like are provided with an association information holding unit that holds in advance information indicating correspondences between the customer names of plural customers and the printer names of plural printing apparatuses owned by the customers, and a print setting management unit that collectively manages settings of print conditions of the plural printing apparatuses. The association information holding unit and the print setting management unit serve as main components of the present invention, and are more preferably realized by an application, a sort of software of personal computers.

As described above, also in the extranet environment, like the intranet environment of FIG. 1 described previously, the print distribution system of the present invention can be realized. The print distribution system in the extranet environment in FIG. 12 eliminates the need to randomly distribute printed materials such as press advertisements to an indefinite number of customers, contributing to reduction in advertisement costs.

As has been described above, according to the print distribution system of the present invention, mere specification of the user names of plural users (including customers) locates printing apparatuses such as plural printers of distribution destinations to instruct them to start printing. Therefore, the print distribution system can support any types of printer languages regardless of the types of printers.

Further, according to the print distribution system of a representative embodiment of the present invention, the print distribution function can be realized in even plural printers having no multi-stacker function.

According to the print distribution system of a representative embodiment of the present invention, since the arrival of printed documents, printer materials, and the like is indicated by mail, users' neglect to read them can be reduced.

Further, according to the print distribution system of a representative embodiment of the present invention, since commodity advertisements and discount coupons can be distributed directly to customers, advertisements and appealing to customers can be effectively performed.

Further, according to the print distribution system of a representative embodiment of the present invention, press advertisements having been randomly distributed to an indefinite number of people become unnecessary, resulting in reduction in advertisement costs.

The invention claimed is:

1. A print distribution system in which plural printing apparatuses are connected over a network, and printed data created by a data processing apparatus used in a sender is distributed to plural distribution destinations, the print distribution system comprising:
    an association information holding unit that holds in advance information indicating correspondences between plural distribution destinations and plural printing apparatuses used in the plural distribution destinations; and
    a print setting management unit that collectively manages settings of print conditions of the plural printing apparatuses,
    wherein, when a request to print out the printed data is outputted to the plural distribution destinations from the sender, the print setting management unit, on the basis of information held in the association information holding unit, locates plural printing apparatuses used in plural distribution destinations specified by the sender, sets the print conditions for the plural located printing apparatuses, and activates printout of the printed data.

2. The print distribution system according to claim 1, wherein the print setting management unit has a function for setting common print conditions for plural printing apparatuses used in the plural distribution destinations.

3. The print distribution system according to claim 1, wherein the print setting management unit has a function for selecting whether to set print conditions specific to each of the plural distribution destinations or to set print conditions common to plural printing apparatuses used in the plural distribution destinations.

4. The print distribution system according to claim 1, further including plural printed data creation apparatuses for creating printed data of the plural printing apparatuses and performing the printout.

5. The print distribution system according to claim 1, having a function that, when a request for the printout is issued from the sender, prevents an error detected in a specific printing apparatus of the plural printing apparatuses used in the plural distribution destinations from affecting the printout of other printing apparatuses.

6. The print distribution system according to claim 1, having a function that notifies the plural distribution destinations by mail at almost the same time that the printout has been started.

7. The print distribution system according to claim 1, having a function that, when an error is detected in a specific printing apparatus of the plural printing apparatuses used in the plural distribution destinations, notifies distribution destinations using the specific printing apparatus of contents of the error.

8. A computer-readable medium that instructs a computer to execute:
- a part that holds in advance information indicating correspondences between plural distribution destinations and plural printing apparatuses on a network used in the plural distribution destinations;
- a part that, when a request to print out printed data created in a sender is outputted to the plural distribution destinations from the sender, on the basis of the information held in advance, locates plural printing apparatuses used in plural distribution destinations specified by the sender, and sets print conditions of the plural printing apparatuses for the plural located printing apparatuses; and
- a part that activates the plural located printing apparatuses to print out the printed data according to the set print conditions.

9. A print distribution system in which plural printing apparatuses are connected over a network, and printed data created by a data processing apparatus used in a sender is distributed to plural distribution destinations, the print distribution system comprising:
- an association information holding unit that holds in advance information indicating correspondences between plural distribution destinations and plural printing apparatuses used in the plural distribution destinations; and
- a print setting management unit that collectively manages settings of print conditions of the plural printing apparatuses,
- wherein, when a request to print out the printed data is outputted to the plural distribution destinations from the sender, the print setting management unit, on the basis of information held in the association information holding unit, locates plural printing apparatuses used in plural distribution destinations specified by the sender, sets the print conditions for the plural located printing apparatuses, and activates printout of the printed data, and
- wherein the association information holding unit comprises a database recording information containing at least a sender name of the printed data, a printed data creation apparatus name corresponding to each of the plural printing apparatuses used in the plural distribution destinations, and respective mail addresses of the plural distribution destinations.

* * * * *